T. I. DUFFY.
LAMP AND LAMP AND LICENSE SIGN BRACKET.
APPLICATION FILED AUG. 24, 1912.
1,059,847.
Patented Apr. 22, 1913.
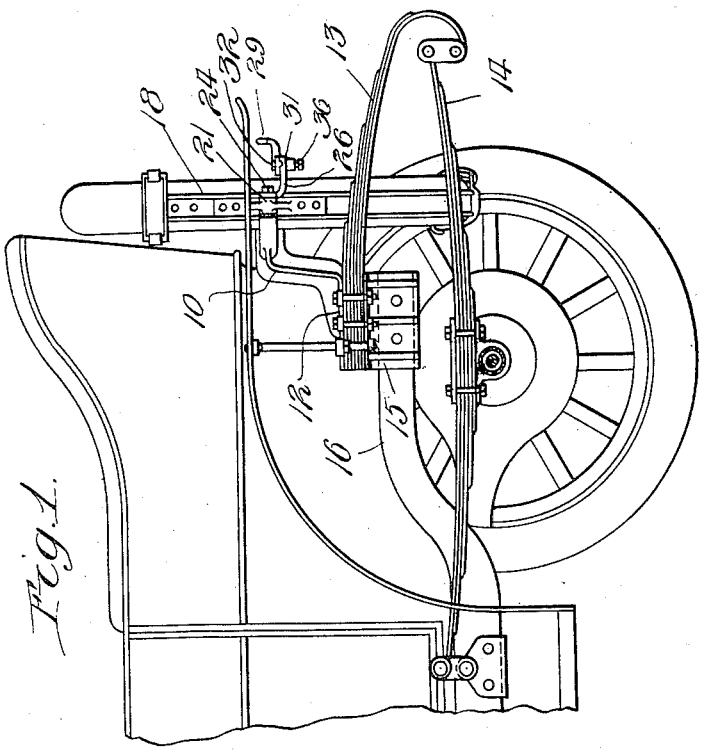
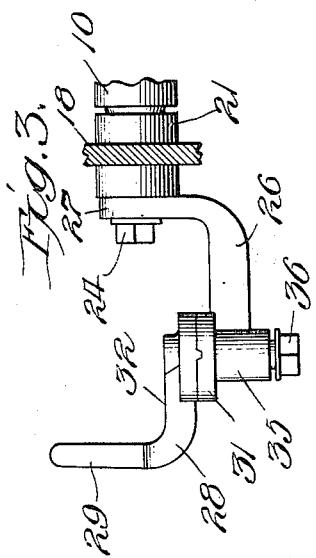
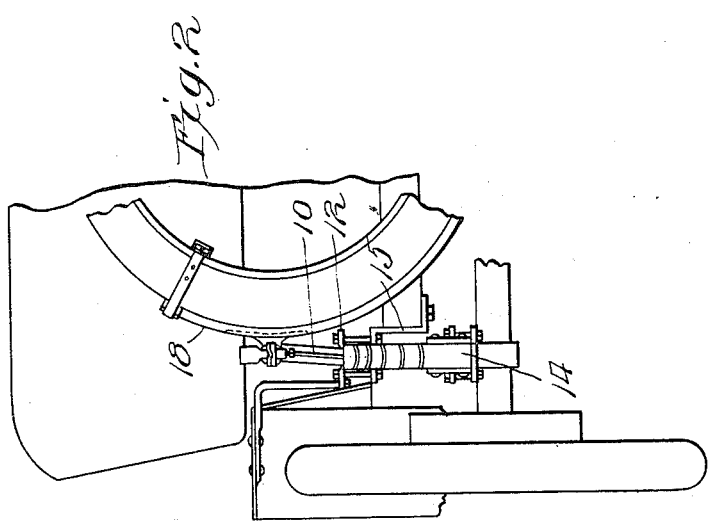
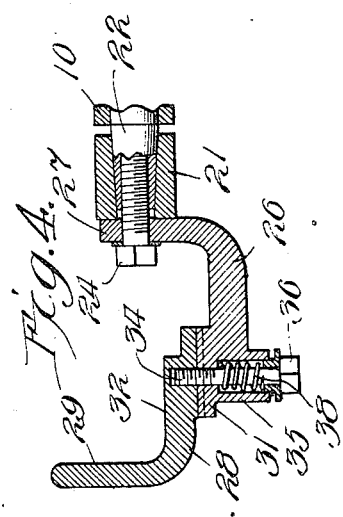
Witnesses:
Harry S. Gaither
G. E. Dowle.
Inventor:
Thomas I. Duffy
by William W. Hall
Atty

UNITED STATES PATENT OFFICE.

THOMAS I. DUFFY, OF CHICAGO, ILLINOIS, ASSIGNOR TO E. C. SALES CO., OF CHICAGO, ILLINOIS, A CORPORATION OF ILLINOIS.

LAMP AND LAMP AND LICENSE-SIGN BRACKET.

1,059,847.  Specification of Letters Patent.  Patented Apr. 22, 1913.

Original application filed June 19, 1912, Serial No. 704,629. Divided and this application filed August 24, 1912. Serial No. 716,904.

*To all whom it may concern:*

Be it known that I, THOMAS I. DUFFY, a citizen of the United States, and a resident of Chicago, in the county of Cook and State of Illinois, have invented certain new and useful Improvements in Lamps and Lamp and License-Sign Brackets; and I do hereby declare that the following is a full, clear, and exact description thereof, reference being had to the accompanying drawings, and to the characters of reference marked thereon, which form a part of this specification.

This invention relates to an improved tail lamp and license sign support for motor vehicles by which to support a tail lamp and license sign on the rear end of a vehicle, and the invention consists in the matters hereinafter set forth and more particularly pointed out in the appended claims.

In the drawings:—Figure 1 is a partial side elevation, with the rear axle shown in section, of a motor vehicle equipped with my improved tail lamp and license sign support. Fig. 2 is a partial rear elevation thereof. Fig. 3 is a side elevation of the lamp supporting bracket, showing means by which it is carried on the vehicle. Fig. 4 is a vertical section thereof.

As shown in the drawings, my improved tail lamp and lamp and license sign bracket is adapted to be attached to and carried by a tire carrier supporting bracket such for instance as is shown in my pending application for United States Letters Patent, Serial No. 704,629, filed June 19th, 1912, of which this application is a division. It may, however, be otherwise attached to the part which carries the same. In said drawings 10, 10 designate combined spring clips and tire carrier brackets. The spring clip portions 12 of the brackets overlie the upper members 13 of the vehicle springs 14 and are bolted to flanged fittings 15 carried by the frame bars 16 of the vehicle body. The tire carrier 18, supported by said brackets 10 is provided with laterally directed hollow lugs 21 which are interiorly tapered, as shown in Fig. 3, to fit over tapered pins or studs 22 that are driven into openings in the rear ends of the brackets 10, 10. The said fittings 21 are confined on said tapered pins or studs by screw bolts 24, 24 screw-threaded into axial openings in the tapered pins or studs 22.

My improved tail lamp or lamp and license sign supporting bracket, comprises an attaching member 26 having a lug or upturned part 27 that is apertured to receive the screw bolt or stud 24 by which it is attached to the rear end of the bracket 10; and an outer member 28 having an upstanding portion or lug 29 to which is adapted to be attached a tail lamp, or a combined tail lamp and license sign. The said members 26 and 28 are provided at their adjacent ends with hub portions 31, 32, arranged horizontally one over the other, and herein shown as fastened together by a bolt 34 that is screw-threaded to the upper hub member 32 and extends downwardly through a hollow lug or boss 35 of the lower hub member. Said bolt 34 extends downwardly beyond said hollow boss and is provided at its lower end with a head 36. Within the hollow boss or lug, and between a shoulder therein and a flanged washer fitted against said head 36, is a spiral expansion spring 38 which tends to hold together the ribbed and grooved faces of the hub members 31, 32. The bolt 34 may be screwed to a greater or less extent into the hub 32, whereby the tension of the spring 38 may be varied or adjusted. The said spring 38 is made of sufficient strength to reliably hold the ribbed and grooved faces of the hub members together and to prevent the lamp carrying member accidentally turning on its axis. It is sufficiently weak, however, to enable the lamp carrying member to be turned by hand without removing the bolt or stud 34.

The lamp and license sign bracket, thus described, is adapted to support a tail lamp and license sign with the license sign arranged in a plane in rear of and parallel to the plane of the tire in the carrier; and the construction described permits the outer member 28 of the lamp and license sign bracket to be turned on the axis of the bolt 34 to swing the license sign outwardly away from the tire or tires, so that the latter may be laterally removed from the carrier, when the carrier assumes the form shown in Figs. 1 and 2.

The bracket shown is an exceedingly simple device to support a tail lamp or lamp and license sign on a vehicle and permits the license sign to occupy a position in rear of the tire carrier and to be readily swung away from the carrier when a tire is to be removed from or placed in the carrier.

I claim—

1. A lamp and license sign support comprising a horizontal attaching member provided at one end with means to fix the same to a car and at its other end with a hub, a supporting member provided at its inner end with a hub to engage the hub of the attaching member and formed at its outer end to support a lamp, and a bolt extending loosely through the supporting member and screw-threaded to the attaching member to clamp the hub parts together.

2. A lamp and license sign support comprising a horizontal attaching member provided at one end with means to fix the same to a car and at its other end with a hub, a supporting member provided at its inner end with a hub to engage the hub of the attaching member and formed at its outer end to support a lamp, and a bolt extending loosely through the supporting member and screw-threaded to the attaching member to clamp the hub parts together, said hub members being roughened on their proximate faces, and a spring applied between the bolt and the attaching member to hold the hub parts yieldingly together.

3. A lamp and license sign support comprising an attaching member provided at one end with means to fasten it to a car, and at its other end with a roughened bearing face, a supporting member provided with a roughened bearing face to engage the bearing face of the attaching member and provided with an upturned lamp supporting lug, pivot means extending through the bearing faces and attached to the supporting member and loosely extending through the attaching member, said attaching member being formed with a housing through which the pivot means extend and a spring surrounding the pivot means within the housing and interposed between the attaching member and a shoulder on the pivot means.

In testimony, that I claim the foregoing as my invention I affix my signature in the presence of two witnesses, this 20th day of August, 1912.

THOMAS I. DUFFY.

Witnesses:
G. E. DOWLE,
W. L. HALL.